(12) United States Patent
Sawhney et al.

(10) Patent No.: US 8,838,072 B2
(45) Date of Patent: Sep. 16, 2014

(54) APPARATUS AND METHOD FOR MOBILE PERSONAL ASSISTANT

(75) Inventors: Parvinder Sawhney, Fremont, CA (US); Peter King, San Mateo, CA (US); Hyoung Wook Ham, San Ramon, CA (US); Luyi Wang, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 243 days.

(21) Appl. No.: 13/207,781

(22) Filed: Aug. 11, 2011

(65) Prior Publication Data
US 2013/0040615 A1 Feb. 14, 2013

(51) Int. Cl.
*H04M 11/10* (2006.01)
*H04W 4/02* (2009.01)
*H04W 4/00* (2009.01)

(52) U.S. Cl.
CPC .............. *H04W 4/021* (2013.01); *H04W 4/001* (2013.01)

USPC ...................... 455/412.1; 455/412.2; 455/413; 455/414.1; 455/418; 379/1.02; 379/41; 379/51; 379/67.1; 379/68; 379/70

(58) Field of Classification Search
USPC ............ 455/412.1, 412.2, 414.1; 379/207.15, 379/1.02, 41, 51, 67.1, 68, 70; 709/206
See application file for complete search history.

(56) References Cited

U.S. PATENT DOCUMENTS

| | | | |
|---|---|---|---|
| 2007/0043687 A1* | 2/2007 | Bodart et al. ...................... 707/1 |
| 2008/0318562 A1* | 12/2008 | Featherstone et al. ......... 455/418 |
| 2010/0029230 A1* | 2/2010 | Linsky ........................... 455/130 |
| 2010/0098231 A1* | 4/2010 | Wohlert .................... 379/207.15 |

* cited by examiner

*Primary Examiner* — Khalid Shaheed
(74) *Attorney, Agent, or Firm* — Jefferson IP Law, LLP

(57) ABSTRACT

An apparatus and method for providing a mobile personal assistant are provided. The method includes receiving a telephone call at a mobile terminal, determining whether a user of the mobile terminal is available to take the call based on a current context of the mobile terminal; and when the user of the mobile terminal is not available to take the call, handling the call by a mobile personal assistant on behalf of the user.

17 Claims, 3 Drawing Sheets

APPARATUS AND METHOD FOR MOBILE PERSONAL ASSISTANT

BACKGROUND OF THE INVENTION

1. Field of the Invention

The present invention relates to an apparatus and method for mobile applications. More particularly, the present invention relates to an apparatus and method for a mobile personal assistant for handling calls under certain contexts.

2. Description of the Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Typically, when a mobile terminal user receives a call but is unavailable, the call is routed to a voice mail server. The voice mail server is located remotely and enables the caller to leave a message for the user. The user can listen to the voice mail message by connecting to the voice mail server.

However, voice mail systems are difficult to install and do not provide flexible options for customizing a message or providing options for callers. If a user is going to be at a meeting, the user can log in to the voice mail server and change the automated greeting to specify that the user is at a meeting. This quickly becomes tedious, as the user must log in to the voice mail server before each meeting to change the greeting, and then log in after each meeting to change the greeting back.

The options provided to the caller are similarly limited. The caller may leave a message, and in some systems, provide a callback number. However, the caller has no way of knowing if or when the message will be read. The caller must wait for the user to return the call, or the caller must try again at another time, with no guarantee that the next call will get through.

Voice mail systems are also designed for multiple users. Due to the complexities involved in setting up and maintaining a voice mail system, a single user is not able to design a voice mail system for his or her own needs. Instead, the user generally relies on the voice mail system offered by an employer or service provider.

Accordingly, there is a need for an apparatus and method for providing a mobile personal assistant for improved call handling.

SUMMARY OF THE INVENTION

Aspects of the present invention are to address at least the above-mentioned problems and/or disadvantages and to provide at least the advantages described below. Accordingly, an aspect of the present invention is to provide an apparatus and method for a mobile personal assistant for improved call handling.

In accordance with an aspect of the present invention, a method for handling a call received by a mobile terminal is provided. The method includes receiving a telephone call at a mobile terminal, determining whether a user of the mobile terminal is available to take the call based on a current context of the mobile terminal; and when the user of the mobile terminal is not available to take the call, handling the call by a mobile personal assistant on behalf of the user.

In accordance with another aspect of the present invention, a mobile terminal is provided. The mobile terminal includes an antenna for receiving and transmitting cellular communications, a modem for demodulating audio data from a received cellular data and for modulating audio data into cellular data, an Application Processor (AP) for executing applications stored on the mobile terminal, an audio codec for forwarding audio data between the modem and the AP, and a mobile personal assistant for controlling the audio codec to forward the audio data from the modem to the AP, and for handling a call received by the mobile terminal when a user of the mobile terminal is not available, based on a current context of the mobile terminal.

In accordance with another aspect of the present invention, a method of handling a call received by a mobile terminal is provided. The method includes receiving a telephone call, determining whether a user of the mobile terminal is available to take the call, based on a current context of the mobile terminal, and when the user is not available, controlling an audio codec to forward incoming audio data to an Application Processor (AP) for handling by a mobile personal assistant, and for controlling the audio codec to forward audio data generated by the mobile personal assistant to a modem for transmission to a caller placing the call.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and method for a mobile personal assistant. The mobile personal assistant enables a single user to deploy a system similar to Interactive Voice Response (IVR) voice mail systems deployed by telephone companies for their customers and businesses for their employees. While these IVR systems are typically fairly complex and are designed to handle multiple users, a mobile personal assistant according to exemplary embodiments of the present invention may be deployed as an application on a mobile terminal that is customizable by the user of that mobile device. According to exemplary embodiments of the present invention, the user may define rules and contexts in which a mobile personal assistant responds to calls received by the user's mobile device.

Figure 1:
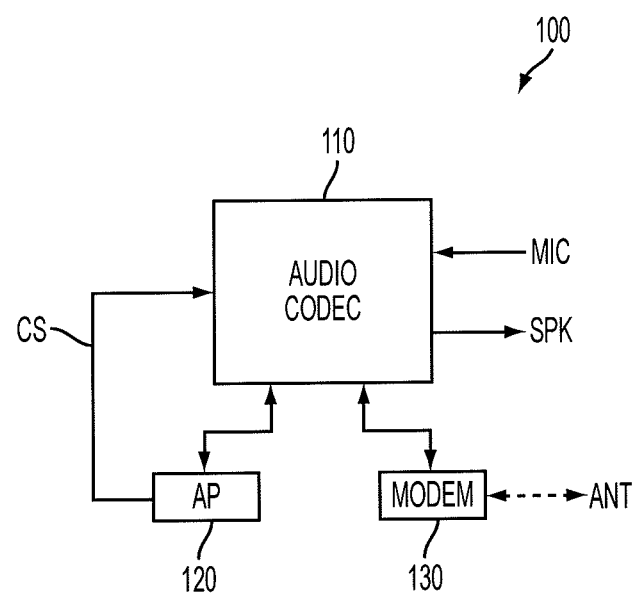
FIG. 1 is an overview of a sound path in a mobile device employing a mobile personal assistant according to an exemplary embodiment of the present invention.

FIG. 1 is an overview of a sound path in a mobile device employing a mobile personal assistant according to an exemplary embodiment of the present invention.

Referring to FIG. 1, a mobile terminal 100 according to an exemplary embodiment of the present invention includes an audio codec 110, an Application Processor (AP) 120, and a modem 130. The components shown in FIG. 1 are all implemented as hardware components. The AP 120 may be the Central Processing Unit (CPU) or CPU core of the mobile terminal, or may be a separate processor (or processor core) dedicated to applications of the mobile terminal. For example, the AP 120 may be an SC5C110 processor manufactured by Samsung Electronics, Ltd.

The AP 120 runs applications used by the mobile device 100. The AP 120 runs the application code and controls operations of the mobile device, such as the display unit, memory, and the like, according to the application instructions.

The modem 130 modulates an analog carrier signal to encode data, and demodulates the analog carrier signals to decode the audio data contained in the analog carrier signal. During a typical telephone call, the modem 130 operates autonomously, without outputting signals to the AP 120. However, when an application utilizes voice, the modem 130 transmits the demodulated data to the AP 120 for processing via the audio codec 110. Similarly, any audio data for transmitting as a result of an application is transmitted to the modem 130 for modulation and transmission via the antenna.

The audio codec 110 handles data transmission between the AP 120, the modem 130, a microphone, and speakers. Audio input from the microphone is transmitted to the AP 120 or the modem 130 for processing according to the particular operations of the mobile terminal. Similarly, audio to be output to the speakers is processed by the audio codec 110.

In addition, the audio codec 110 may relay audio data between the modem 130 and the AP 120. According to an exemplary embodiment of the present invention, the mobile personal assistant is an application running on the AP 120. A typical telephone call is handled by the modem 130, not by the AP 120. In order for the mobile personal assistant to handle an incoming call while the user is unavailable, the AP 120 may control the audio codec 110 to forward the audio data from the modem 130 to the AP 120. The mobile personal assistant may then interact with the caller according to the context and rules defined by the user. If the mobile personal assistant needs to output audio via the telephone connection, the audio data may be transmitted to the modem 130 via the audio codec 110.

The AP 120 may control the audio codec 110 to forward the audio data from the modem 130 via a control signal CS. The control signal CS enables the mobile personal assistant to switch between a standard telephone mode in which the call is handled by the modem 130 and a communication telephone mode in which the call is handled by the AP 120 in conjunction with the modem 130. In the communication telephone mode, data received from the caller via an antenna is forwarded from the modem 130 to the AP 120 via the audio codec 110, and data to be output to the caller is forwarded from the AP 120 to the modem 130 via the audio codec 110.

During a typical telephone call, in which the user answers the call and carries on a conversation with the caller, a cellular telephone signal received by an antenna of the mobile terminal is demodulated into audio data by the modem 130. The modem 130 forwards the audio data to the audio codec 110, which converts the digital audio data into an analog signal, and outputs the analog signal to the speakers. When the user speaks into the microphone, this process is performed in reverse: the audio codec 110 converts the analog signals received from the microphone into digital data, and the modem 130 in turn modulates the digital data into a signal for transmission via the antenna.

When a call is to be handled by the mobile personal assistant, the AP 120 generates the control signal CS to forward the incoming audio data to the AP 120 instead of the microphone. From the perspective of the modem 130 this operation is transparent: the modem 130 continues to forward demodulated audio data to the audio codec 110 and to modulate audio data received from the audio codec 110. However, the audio codec 110 forwards the received audio data to the AP 120 instead of to the microphone, and it is the AP 120, not a speaker, that generates the audio data to be modulated for transmission. Similarly, from the perspective of the cellular telephone network, the user is deemed to have answered the call, even though it is the mobile personal assistant interacting with the caller instead of the user.

The control signal CS may be generated in a number of ways. For example, if the mobile terminal 100 supports the Android Operating System (OS) offered by Google, Inc., the control signal may be generated by a call to the setMode( ) function defined in the AudioManager object class of the Android Application Programming Interface (API). Other OSes, such as Windows Phone (offered by Microsoft, Inc.) or iOS (offered by Apple, Inc.), may include similar mechanisms for generating the control signal CS.

The operation of the mobile personal assistant and the mobile terminal 100 are described in more detail below with respect to FIGS. 2 and 3

Figure 2:
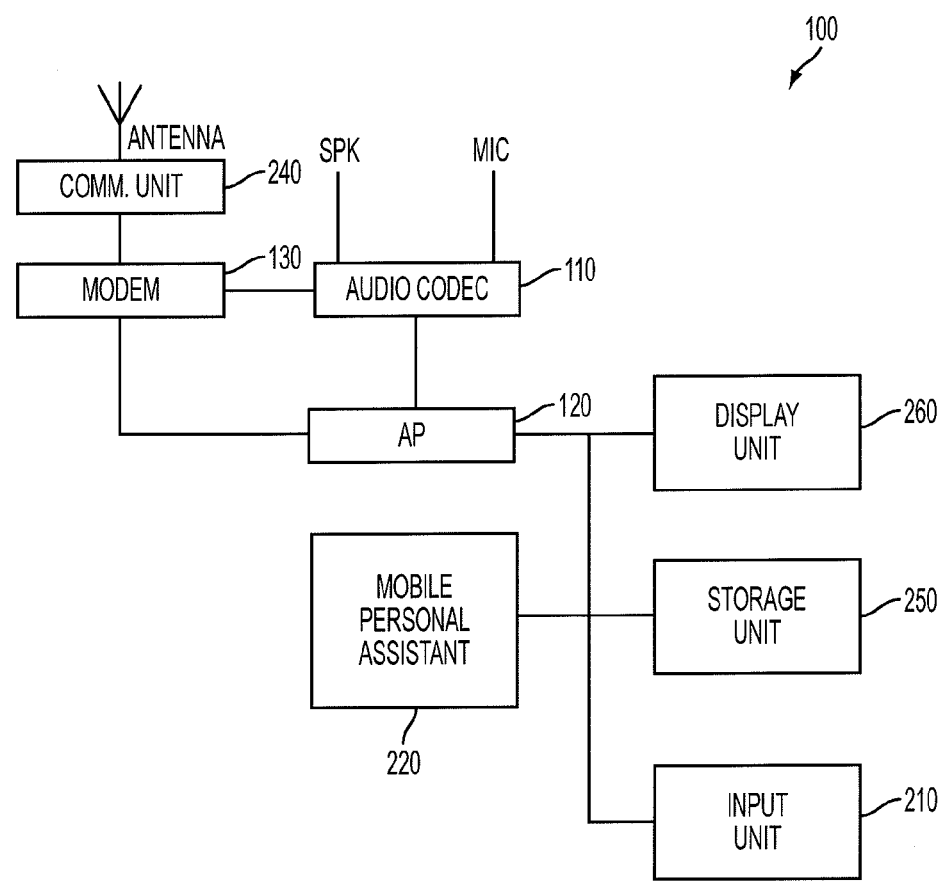
FIG. 2 is a diagram of a mobile terminal according to an exemplary embodiment of the present invention.

FIG. 2 is a diagram of a mobile terminal according to an exemplary embodiment of the present invention.

Referring to FIG. 2, the mobile terminal 100 includes the audio codec 110, the AP 120, the modem 130, an input unit 210, a mobile personal assistant 220, a communication unit 240, a storage unit 250, and a display unit 260. The operations of the audio codec 110, the AP 120, and the modem 130 have been described above with respect to FIG. 1. The mobile terminal may also include additional units not shown here for clarity, such as a Global Positioning System (GPS) unit or a camera unit. Similarly, the functionality of two or more of these units may be integrated into a single component, as appropriate.

The communication unit 240 communicates with the modem 130 to transmit and receive data via an antenna. The antenna may be a component of the communication unit 240, or the antenna may be arranged separately. For purposes of clarity, the communication unit 240 is shown separately from the modem 130, but the communication unit 240 and the modem 130 may form a single component.

The display unit 260 displays information to the user of the mobile 100. The display unit 260 may be provided as a Liquid Crystal Display (LCD). In this case, the display unit 160 may include a controller for controlling the LCD, a video memory in which image data is stored and an LCD element. If the LCD is provided as a touch screen, the display unit 260 may perform a part or all of the functions of the input unit 210.

The input unit 210 receives input from the user. The input unit 210 may include a touch screen integrated with the display unit 260, as mentioned above. The input unit 210 may also include one or more key switches in addition to, or instead of, the touch screen.

The storage unit 260 stores applications and data used by the mobile terminal 100. For example, the storage unit 260 may store the OS used by the mobile terminal 100, the mobile personal assistant 220, and other information employed by the mobile personal assistant and described below.

The mobile personal assistant 220 handles incoming calls on behalf of the user while the user is unavailable. Whether the mobile personal assistant handles calls, and how the calls are handled, may be defined according to contexts and rules defined by the user. The user may define a variety of rules according to a variety of contexts.

A context may denote a particular state of the user or of the mobile device. Contexts may include schedule information, location information, and other types of information which the mobile personal assistant 220 can extract from the mobile terminal 100 or from other applications and information stored on the mobile terminal 100.

The rules define actions taken by the mobile personal assistant 200 with respect to particular contexts. The rules may specify whether the mobile personal assistant 220 is to handle a call, and what options the mobile personal assistant 220 may present to the caller. For example, the user can define rules for the mobile personal assistant to handle calls when the user is in a meeting. When a call is received, the mobile personal assistant retrieves the user's schedule from a schedule or calendar application and determines whether the user is scheduled to be in the meeting. If the user is in the meeting, the mobile personal assistant 220 handles the call according to the rules defined by the user.

The user may also define rules according to additional contexts. For example, the user may define rules for particular locations. If the mobile terminal 100 is equipped with a GPS unit or other unit capable of determining the location of the mobile terminal 100, the mobile personal assistant 220 may use location information provided by such a unit to handle calls. If the user is at a church, for example, the mobile personal assistant 220 may handle calls to the mobile terminal 100 so that the church service is not disrupted.

Where multiple contexts have been defined, the user may also define a hierarchy of contexts to avoid conflicts. For example, when the user is at a particular meeting, the mobile personal assistant 220 may first determine whether rules have been defined for the particular meeting, and if not, determine whether rules have been defined for a general meeting. Finally, the mobile personal assistant 220 may determine whether rules have been defined for a location of the mobile terminal 100. If the current context does not have any defined rules, the mobile personal assistant 220 may permit the call to pass through to the user in the standard fashion.

When the mobile personal assistant 220 determines that rules associated with a particular context apply, the mobile personal assistant 220 causes the AP 120 to generate the control signal CS and transfer the audio from the modem 130 to the AP 120. The mobile personal assistant 220 may then answer the call on the user's behalf and present options to the caller according to the defined rules.

In addition, the user may activate the mobile personal assistant 220 on an ad hoc basis, which might occur when the user cannot receive calls for an unexpected reason. For example, if the user is called to an unexpected meeting, the user can activate the mobile personal assistant 220 to handle calls while the user is in the meeting. The user may set the mobile personal assistant to use the ad hoc context, and then restore the mobile personal assistant 220 to normal operating status when the meeting is complete.

Similarly, the mobile personal assistant could also be utilized "on demand". For example, when the user receives a call, a user interface element may be presented on the screen to enable the user to invoke the mobile personal assistant 220. If the user selects the user interface element, the mobile personal assistant 220 handles the call on behalf of the user. The actions taken by the mobile personal assistant 220 in this situation may be pre-set by the user.

The mobile personal assistant 220 may provide a variety of services to the caller, based on the rules defined by the user. The services may include a transfer to a voice mail service, leaving a message for the user to be stored in the storage unit 260, setting up a callback time, setting up a meeting, or obtaining information stored in the storage unit 260. The user-defined rules for each context may also define the services to be offered in that context. If the caller also employs a mobile personal assistant, more enriched options may be available. An exemplary operation of the mobile personal assistant 220 is described below with respect to FIG. 3.

Figure 3:
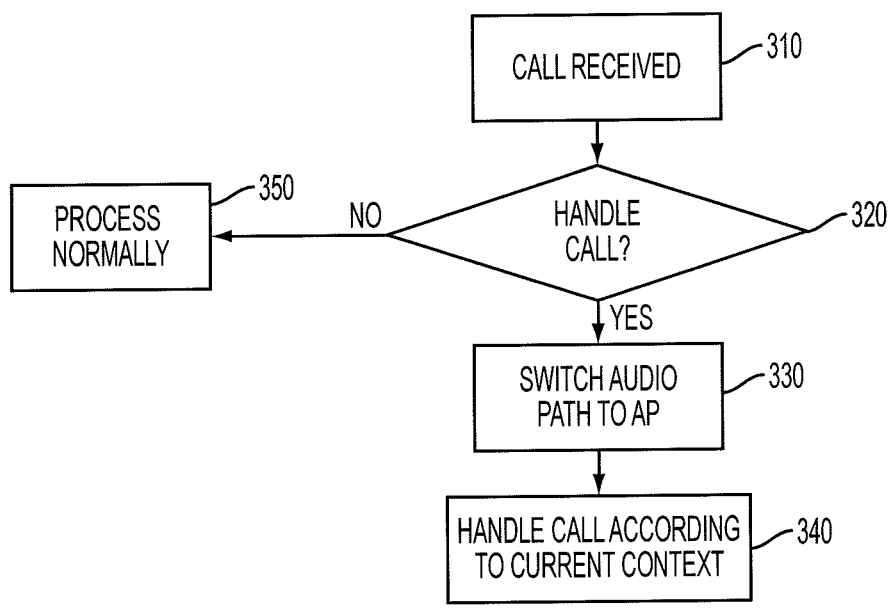
FIG. 3 illustrates a method for operating a mobile personal assistant according to exemplary embodiments of the present invention.

FIG. 3 illustrates a method for operating a mobile personal assistant according to exemplary embodiments of the present invention.

Referring to FIG. 3, the mobile terminal 100 receives a telephone call in step 310. While the modem 130 processes the telephone call, the AP 120 executes the mobile personal assistant 220. The mobile personal assistant 220 may be operating as a background application, and may be triggered when a call is received.

In step 320, the mobile personal assistant 220 determines whether the call is to be handled by the mobile personal assistant 220. The mobile personal assistant 220 may make the determination when the call is received by consulting the stored context information and rules. In this case, the mobile personal assistant 220 is activated upon receipt of the call, and uses the stored context and rule information to determine whether the user is unavailable. The mobile personal assistant 220 may also prevent the mobile terminal 100 from ringing or vibrating, so as not to disturb the user. Similarly, if the mobile terminal 100 is set to ring audibly, the mobile personal assistant 220 may control the mobile terminal 100 to vibrate instead, so as to notify the user that a call has been received.

Alternatively, the mobile personal assistant 220 may wait until the user does not answer the call after a predetermined number of rings. In this case, the mobile personal assistant 220 acts as a replacement for a standard voice mail service—instead of the call automatically transferring to a voice mail server, the caller remains connected to the mobile terminal 100 while the mobile personal assistant 220 determines how the call is to be handled. The mobile personal assistant 220 may permit the mobile terminal 100 to ring or vibrate.

If the call is not to be handled by the mobile personal assistant 220, the call is treated as a standard telephone call in step 350. In this case, the call may be transferred to a voice mail server to enable the caller to leave a message for the user according to a standard voice mail system.

If the call is to be handled by the mobile personal assistant 220, the mobile personal assistant 220 generates the control signal CS to transfer the call from the modem 130 to the AP 120 in step 330. Instead of forwarding the audio to a speaker of the mobile terminal 120, the modem 130 forwards the audio to the AP 120 via the audio codec 110. The audio codec 110 may convert the output of the modem 130 into a digital format suitable for the AP 120 and the mobile personal assistant 220.

While the mobile personal assistant 220 is handling the call, the mobile personal assistant 220 may display a user interface element on the display unit 260 to inform the user that the mobile personal assistant 220 is handling a call. The user interface element may include, for example, a full screen user interface or an icon. The user interface element may indicate the identity of the user and provide an option for the user to take over the call. If the user wishes to take over the call, the mobile personal assistant 220 generates the control signal CS to control the audio codec 110 to transmit audio data to the microphone and received audio data from the speaker as in a typical telephone call. The mobile personal assistant 220 may also notify the caller that the user will be accepting the call.

In step 340, the mobile personal assistant 220 answers the call on the user's behalf and enables the caller to select from options defined by the user according to the particular context. The mobile personal assistant 220 may answer the call by playing a pre-recorded audio greeting to the caller indicating that the user is not available. The pre-recorded audio greeting may be a default greeting provided by the manufacturer of the mobile personal assistant 220, or may be a greeting pre-recorded by the user. Similarly, the greeting to be played may depend upon the particular context, and the user may associate a particular greeting with a particular context.

After the pre-recorded greeting is played, the mobile personal assistant 220 presents options to the user for how the call is to be handled. The mobile personal assistant 220 may employ an Interactive Voice Response (IVR) system to guide the user through the various options. Other systems that may be employed include a Text-To-Speech (TTS) system and a Dual-Tone Multi-Frequency system (e.g., Touch-Tone).

A variety of options may be presented to the caller, and the mobile personal assistant 220 may also interact with other applications on the mobile terminal 100 to assist the caller. For example, the mobile personal assistant 220 may give the caller the option to schedule an appointment or a call-back time. In this case, the mobile personal assistant 220 may consult a schedule or calendar application to determine when the user is available. The mobile personal assistant 220 then provides voice prompts so that the caller can schedule a convenient time. Once an appointment or call-back time has been made, the mobile personal assistant 220 enters the information into the schedule or calendar application.

Other options may include leaving a voice mail message or providing basic information to the caller in response to the caller's request. If the caller wishes to leave a voice mail message, the mobile personal assistant 220 may transfer the call to a standard voice mail server for further processing.

The mobile personal assistant 220 may also provide certain basic information to the caller, depending upon the context and (optionally) the caller's identity. For example, if the caller is looking for the telephone number of a mutual friend, the mobile personal assistant 220 may consult an address book application stored on the mobile terminal 100 and provide the information to the user, without disturbing the user in the process.

If the caller is also using a mobile personal assistant, the caller's mobile personal assistant may interact with the mobile personal assistant 220 to provide additional or enhanced options. For example, the caller may use his or her mobile personal assistant to schedule an appointment or call-back time. The caller's mobile personal assistant may display a user interface on the caller's screen to set up a convenient call-back time, and then provide the information to both the mobile personal assistant 220 and the caller's own schedule or calendar application.

Although a few options have been described above, a wide variety of options and contexts may be defined by the user in addition to, or instead of, the options described above. The particular options provided by the mobile personal assistant 220 may depend upon the particular context and upon the identity of the caller. The mobile personal assistant 220 may obtain the identity of the caller using Caller ID information provided by the mobile telephone network when the call is received by the mobile terminal 100.

The mobile personal assistant 220 may also be used to screen calls for the user. In this case, the user may define a context and/or associated rules in which the mobile personal assistant 220 automatically handles calls on the user's behalf. Alternatively, the mobile personal assistant 220 may determine whether to handle the call based on a Caller ID of the caller. If the Caller ID corresponds to a known caller, or a caller whom the user wishes to speak to, the mobile personal assistant 220 may allow the call to proceed normally. Otherwise, the mobile personal assistant 220 may handle the call on behalf of the user as if the user were unavailable.

The mobile personal assistant 220 may be implemented as an application of the mobile terminal 100. The mobile personal assistant 220 may be pre-installed in the mobile terminal 100, or may be downloaded by the user from an application store or other source.

To configure the mobile personal assistant 220, the user executes the mobile personal assistant 220 while the mobile terminal 100 is not receiving a call. The user may execute the mobile personal assistant 220 by, for example, tapping an application icon displayed in a user interface screen of the mobile. The mobile personal assistant 220 displays a user interface on the display unit 260 through which the user may set various contexts in which the mobile personal assistant 220 is to handle incoming calls, and rules and options associated with these contexts. When the MPA employs a TTS system, the user can supply the text to be spoken by the MPA when handling a call.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for handling a call received by a mobile terminal, the method comprising:
   receiving a telephone call at a mobile terminal;
   determining whether a user of the mobile terminal is available to take the call based on a current context of the mobile terminal;
   when the user of the mobile terminal is not available to take the call, generating a control signal;
   routing a sound path of sound data in the mobile terminal according to the control signal such that sound data is output from a modem of the mobile terminal to an Application Processor (AP) of the mobile terminal or input from the AP to the modem;
   handling the call by a mobile personal assistant executing on the AP on behalf of the user when the user is not available to take the call; and
   displaying a user interface element on a display unit of the call while the call is handled by the mobile personal assistant, the user interface element indicating that the mobile personal assistant is handling the call and including a user interface sub-element for enabling the user to terminate operations of the mobile personal assistant and receive the call.

2. The method of claim 1, wherein the determining of whether the user is available comprises:
   determining the current context of the mobile terminal; and
   determining whether the user is available based on the current context and rules associated with the current context.

3. The method of claim 2, wherein the handling of the call comprises:
   accepting the call on behalf of the user by the mobile personal assistant;
   determining a current context of the mobile terminal based on stored context information and rules previously set by the user; and
   handling the call based on the context information and the rules.

4. The method of claim 3, wherein the handling of the call based on the context information and the rules comprises:
   handling the call with an Interactive Voice Response (IVR) system.

5. The method of claim 3, wherein the handling of the call based on the context information comprises:
   presenting at least one option to the user based on at least one of the stored context information, the rules, and an identity of the caller; and
   performing the option selected by the caller.

6. The method of claim 5, wherein the at least one option comprises at least one of:
   scheduling an appointment;
   scheduling a time at which the user of the mobile terminal will return the call;
   identifying a time in which the user will be available to take the call;
   leaving a message for the user; and
   providing information to the user.

7. The method of claim 1, wherein the mobile personal assistant is an application stored on the mobile terminal.

8. The method of claim 7, wherein the mobile personal assistant obtains the current context from information stored on the mobile terminal.

9. The method of claim 1, wherein the current context includes at least one of:
   a current location of the mobile terminal;
   a schedule of the user; and
   user-defined information indicating that the user is not available.

10. The method of claim 1, wherein the current context indicates that the user has selected a predetermined user interface element displayed when the call is received at the mobile terminal.

11. A mobile terminal, comprising:
    an antenna for receiving and transmitting cellular communications;
    a modem for demodulating audio data from a received cellular data and for modulating audio data into cellular data;
    an Application Processor (AP) for executing applications stored on the mobile terminal;
    an audio codec for forwarding audio data between the modem and the AP;
    a mobile personal assistant for determining whether a call received by the mobile terminal should be handled by the mobile personal assistant, based on a current context of the mobile terminal, for controlling the audio codec to forward the audio data from the modem to the AP when it is determined that the call is to be handled by the mobile personal assistance, and for handling the call on behalf of the user when the user is not available; and
    a display unit for displaying a user interface element while the mobile personal assistant is handling the call, the user interface element indicating that the mobile personal assistant is handling the call and including a user interface sub-element for enabling the user to terminate operations of the mobile personal assistant and receive the call,
    wherein, when the mobile personal assistant determines that the call is to be handled by the mobile personal assistant, the mobile personal assistant controls the audio codec to forward audio data of the call to the AP.

12. The mobile terminal of claim 11, further comprising:
    a storage unit for storing the mobile personal assistant, context information previously set by the user, and rules for handling calls by the mobile personal assistant according to the current context and the previously set contexts,
    wherein the mobile personal assistant determines whether to handle the call based on the stored context information, the current context, and the rules.

13. The mobile terminal of claim 12, wherein, when the mobile personal assistant determines that the call is to be handled by the mobile personal assistant, the mobile personal assistant executes an Interactive Voice Response (IVR) system to provide at least one option to a caller for handling the call while the user is unavailable.

14. The mobile terminal of claim 13, wherein the mobile personal assistant provides the at least one option to the caller based on at least one of the current context, the stored context information, and an identity of the caller.

15. The mobile terminal of claim 14, wherein the at least one option comprises at least one of:
    scheduling an appointment;
    scheduling a time at which the user of the mobile terminal will return the call;
    identifying a time in which the user will be available to take the call;
    leaving a message for the user; and
    providing information to the user.

16. The mobile terminal of claim 11, wherein the current context and the stored context information each comprise at least one of:
  a current location of the mobile terminal;
  a schedule of the user; and
  user-defined information indicating that the user is not available.

17. The mobile terminal of claim 11, wherein the mobile personal assistant is an application stored on the mobile terminal and executed by the AP.

\* \* \* \* \*